(12) United States Patent
May

(10) Patent No.: US 12,492,716 B2
(45) Date of Patent: Dec. 9, 2025

(54) FLUID PUMP AND FORCE GENERATOR ARRANGEMENT WITH SUCH A FLUID PUMP

(71) Applicant: TOMORROW'S MOTION GMBH, Starnberg (DE)

(72) Inventor: Lutz May, Berg (DE)

(73) Assignee: TOMORROW'S MOTION GMBH, Starnberg (DE)

( * ) Notice: Subject to any disclaimer, the term of this patent is extended or adjusted under 35 U.S.C. 154(b) by 210 days.

(21) Appl. No.: 18/547,430

(22) PCT Filed: Mar. 17, 2022

(86) PCT No.: PCT/EP2022/057080
§ 371 (c)(1),
(2) Date: Aug. 22, 2023

(87) PCT Pub. No.: WO2022/200189
PCT Pub. Date: Sep. 29, 2022

(65) Prior Publication Data
US 2024/0125336 A1 Apr. 18, 2024

(30) Foreign Application Priority Data

Mar. 22, 2021 (EP) .................................. 21164104

(51) Int. Cl.
*F04B 43/04* (2006.01)
*F04F 7/00* (2006.01)
*B64G 1/26* (2006.01)

(52) U.S. Cl.
CPC .............. *F04F 7/00* (2013.01); *F04B 43/046* (2013.01); *B64G 1/26* (2013.01)

(58) Field of Classification Search
CPC .......... F04F 7/00; F04B 43/04; F04B 43/046; F04B 45/04; F04B 45/047; B64G 1/22; B64G 1/26; B64G 6/00
See application file for complete search history.

(56) References Cited

U.S. PATENT DOCUMENTS 4,498,851 A * 2/1985 Kolm ...................... F04D 33/00
310/331
5,381,950 A * 1/1995 Aldridge .................. F24F 11/52
337/380

(Continued)

FOREIGN PATENT DOCUMENTS

| CN | 111255667 A | 6/2020 |
|---|---|---|
| DE | 20216976 U1 | 3/2003 |

(Continued)

*Primary Examiner* — Essama Omgba
*Assistant Examiner* — Joseph S. Herrmann
(74) *Attorney, Agent, or Firm* — Fay Kaplun & Marcin, LLP

(57) ABSTRACT

A fluid pump for generating a fluid stream includes a first actuator with a first vibration element, a second actuator with a second vibration element, and a power source supplying energy to the first and second actuators. The pump further includes a controller that is connected to the source and controls the source to vary the energy supplied to the first and second actuators. The first and second actuators are arranged opposite to each other so that a first movement direction of the first element is inclined with respect to a second movement direction of the second element. The controller controls the source so that the first element moves towards the second actuator and the second element moves towards the first actuator in a synchronous manner and thereby cyclically soaks in a fluid from the surroundings and ejects the fluid in a directed manner.

10 Claims, 6 Drawing Sheets

(56) References Cited

U.S. PATENT DOCUMENTS

| | | | |
|---|---|---|---|
| 5,525,041 A * | 6/1996 | Deak | F04F 7/00 |
| | | | 417/322 |
| 5,816,780 A | 10/1998 | Bishop et al. | |
| 2015/0122457 A1 | 5/2015 | Booth et al. | |
| 2015/0125320 A1 * | 5/2015 | Jun | F04D 33/00 |
| | | | 417/410.2 |
| 2018/0100494 A1 * | 4/2018 | Bennett, Jr. | F04B 17/003 |
| 2018/0340529 A1 * | 11/2018 | Bennett, Jr. | F04B 43/0054 |
| 2022/0154734 A1 * | 5/2022 | May | F04F 7/00 |

FOREIGN PATENT DOCUMENTS

| | | |
|---|---|---|
| WO | 03/027503 A1 | 4/2003 |
| WO | 2020/201500 A1 | 10/2020 |

\* cited by examiner

FLUID PUMP AND FORCE GENERATOR ARRANGEMENT WITH SUCH A FLUID PUMP

TECHNICAL FIELD

The description relates to a fluid pump for generating a fluid stream. The fluid pump particularly applies mechanical vibrations and/or acoustic principles to generate a fluid stream and to pump a fluid in a desired direction. Particularly, the fluid pump may be used as a drive that is based on the recoil principle.

TECHNICAL BACKGROUND

Mechanical vibrations may be used to apply energy to a fluid like a gas or a liquid or move such a fluid in a desired direction. When moving or pumping agile substances, especially fluids like gases or liquids, with different viscosities and at different pressure, a number of different physical solutions have been developed in the past. Some of the well-known and established pumping principles are piston operated pumps, gearwheel pumps, centrifugal force related pumps, and propeller-based pumping systems, only to mention a few of them.

What typical mechanical principle based pumping systems have in common is that there are moving parts that have some wear-and-tear, are relatively large and somewhat complex, and in most cases require precision tooling, typically with very strict requirements in regards of tolerances of the components, especially of moving components. The applied mechanical tolerances decide about the system efficiency and how reliable the pumping mechanic may be over time.

WO 2020/201500 A1 describes an acoustic principle based fluid pump. The fluid pump comprises a fluid chamber, a first actuator, a second actuator, and a controller. The fluid chamber is at least partially enclosed by a wall with a first opening and a second opening. The first actuator comprises a first movable element, wherein the first actuator is arranged at least partially within the fluid chamber and positioned between the first opening and the second opening. The second actuator comprises a second movable element, wherein the second actuator is arranged at least partially within the fluid chamber and positioned between the first opening and the second opening. The controller is configured to control a state of the first actuator and the second actuator. The first actuator and the second actuator are offset with respect to one another in a flow direction of the fluid from the first opening to the second opening. The controller is configured to drive the first and second actuator so that a relative position of the respective movable element is determined. The controller is configured to control, at a first time t1, the first movable element to move from an initial position to an at least partially extracted position towards the wall of the fluid chamber and thereby pushing aside the fluid within the fluid chamber, and the controller is configured to control, at a second time t2, the second movable element to move from an initial position to an at least partially extracted position towards the wall of the fluid chamber and thereby pushing aside the fluid within the fluid chamber.

SUMMARY OF THE INVENTION

According to an aspect, a fluid pump for generating a fluid stream is provided. The fluid pump comprises a first actuator with a first vibration element, a second actuator with a second vibration element, a power source that is connected to the first actuator and second actuator to supply energy to the first actuator and second actuator, and a controller that is connected to the power source and configured to control the power source to vary the energy supplied to the first actuator and second actuator. The first actuator and the second actuator are arranged opposite to each other so that a first movement direction of the first vibration element is inclined with respect to a second movement direction of the second vibration element. The controller is configured to control the power source so that the first vibration element moves towards the second actuator and the second vibration element moves towards the first actuator in a synchronous manner and thereby cyclically soaks in a fluid from the surroundings and ejects the fluid in a directed manner.

The fluid pump comprises two actuators. Each actuator comprises a vibration element like a membrane, a piston, or the like. The vibration element is configured to move fore and aft along a movement direction. The movement directions of the first and second vibration elements are inclined with respect to each other, i.e., the first vibration element does not move directly and straight towards the second vibration element, and the second vibration element does not move directly and straight towards the first vibration element.

The power source is connected to the actuators and provides energy, in particular electrical energy, for initiating a movement of the first and second vibration element. The controller is connected to the power source. The controller may send a control command to the power source. Based on the control command, the power source varies or alters the energy supplied to the actuators. For example, the voltage and/or the frequency of the electric energy supplied to the actuators may be varied. The power source may be configured to provide an alternating current to the actuators. The alternating current causes the vibration elements to move fore and aft along the movement direction.

A first movement direction of the first vibration element is inclined with respect to a second movement direction of the second vibration element. Thus, one end of the first actuator is closer to the second actuator than another end of the first actuator. In other words, the volume/space between the first and second actuator is V-shaped or wedge-shaped. The opening angle of the volume/space between the first and second actuator also defines the angle of inclination between the first movement direction of the first vibration element and the second movement direction of the second vibration element.

For example, the first vibration element and the second vibration element are controlled by the power source so that they move synchronously, i.e., when the first vibration element moves towards the second actuator, the second vibration element moves towards the first actuator, and vice versa. Thus, the size of the volume between the first actuator and the second actuator is increased when the first and second vibration elements move away from each other, and the size of the volume is reduced when the vibration elements move towards each other. This movement of the vibration elements generates a fluid stream, particularly a gas or air stream. When the vibration elements move away from each other, fluid is soaked into the volume between the vibration elements from the surroundings of the fluid pump. The air is soaked in from the surroundings from every direction. However, when the vibration elements move towards each other, the air is blown out in a directed manner. Particularly, due to the fact that the volume between the vibration elements is V-shaped, the air is blown out of this volume through the larger opening of the volume. When blowing out the air, this is not blown in every direction, but a directed air stream is generated. Thus, a fluid stream can be generated by repeatedly moving the vibration elements away from and towards each other. The cycle described above is repeated several times, i.e., as long as the fluid flow is required. Since the actuators are arranged opposite to each other, the vibration elements are controlled by the same energy, i.e., with no phase delay between the supplied energy. Thus, both vibration elements move towards each other or away from each other at the same time, i.e., synchronously.

Particularly, the first actuator and the second actuator are powered by an alternating current that is sine-shaped. The frequency of the alternating current may be varied.

A sine-shaped alternating current for powering the first and second actuator may be beneficial because the actuators generate lower audible noise and the first and second actuators are subjected to less stress. However, alternating current with differently shaped signal amplitude may be used, e.g., square-shaped signals. A square-shaped signal may increase the throughput of the fluid pump while the audible noise generated by the fluid pump may increase.

The vibration elements each may include one or more plane working surfaces that are facing each other. The working surfaces move towards each other or away from each other, thereby cyclically soaking in gas from the surrounding and ejecting the air through the first opening (larger opening, the opening of the V-shaped volume) of the volume between the working surfaces. The fluid pump described herein does not require any mechanical valves to control the fluid flow. The fluid flow is generated and controlled by a vibration movement of a vibration element and the resulting effect on a volume defined by a surface of the vibration element.

According to an embodiment, the first actuator and the second actuator are arranged so that a volume between the first vibration element and the second vibration element is V-shaped, and a first opening of the volume is larger than a second opening that is arranged opposite to the first opening.

The V-shaped volume between the first vibration element and the second vibration element defines the angle of inclination between the movement directions of the vibration elements. The opening angle of the V-shaped volume may be between 3° and 20° or any values in between.

According to another embodiment, the first actuator and the second actuator are selected from the group consisting of: a loudspeaker, a piezoelectric element, a hydraulic element that is connected to a piston, a motor that is connected to a piston, a magnetostriction-based actuator.

In one example, the actuators may be acoustic loudspeakers or piezoelectric elements. Generally, the actuators are configured to cyclically move a vibration element fore and aft along a movement direction. This effect can be achieved by several devices, so that the devices specifically named herein are to be considered as non-limiting examples only. For example, the actuators may include a hydraulic element that is coupled to a piston so that the piston is cyclically moved up and down. Instead of a hydraulic element, a motor, e.g., an electric motor, may be used. A magnetostriction-based actuator includes a magneto-strictive material and is configured to create a magnetic field, e.g., by coils that are provided with electric energy, around the magneto-strictive material that will then change its shape and/or dimensions and thus generates micro-movements. These micro-movements are used then to act as the first and/or second actuator.

A loudspeaker typically includes a permanent magnet and an electric magnet. Depending on the electric current supplied to the electric magnet, a movement can be generated based on the magnetic principle.

For example, the first and second actuators are loudspeakers, and the vibration element is the membrane of the loudspeaker. When the loudspeaker is provided with an electric signal, the amplitude and the frequency of that electric signal cause the membrane to vibrate at a certain frequency (corresponding to the frequency of the electric signal) and a certain intensity (corresponding to the voltage amplitude of the electric signal).

The actuators are arranged opposite to each other so that the movement direction of the first vibration element is towards to and away from the second actuator and the movement direction of the second vibration element is towards to and away from the first actuator so that the volume/space between the vibration elements of the first and second actuators changes its size depending on the position and/or movement of the vibration elements.

According to another embodiment, the fluid pump comprises a housing that comprises at least two half-shells, wherein the first actuator is attached to a first half-shell and the second actuator is attached to a second half-shell.

The fluid pump comprises a housing made of two or more half-shells. A first half-shell holds the first actuator in its position and a second half-shell holds the second actuator in its position so that the V-shaped volume between the actuators and their vibration elements is defined. The half-shells may be made of plastic, wood, metal, or any other material. The function of the housing is to hold the actuators in their position and define the V-shaped volume for creating the directed fluid stream. The housing may also include the controller and the power source.

According to another embodiment, the housing defines one or more openings in a side wall that is arranged close to the first opening of the V-shaped volume.

The housing includes and holds the actuators. The housing comprises one or more openings in a side wall that is arranged to overlap with the larger opening of the V-shaped volume. This opening of the housing is used to eject the fluid flow in the eject phase. However, the housing may also include opening at other side walls or side surfaces. Air is soaked in through all of these opening, but it is ejected substantially through that opening that overlaps with the larger opening of the V-shaped volume. However, it is noted that no valves are used and arranged at the housing at the inlet and/or outlet openings. The fluid flow is an effect resulting from the shape of the V-shaped volume and the vibration of the first and/or second actuators.

According to another embodiment, the housing includes guide walls that are arranged between the one or more openings of the housing and the first opening of the V-shaped volume. The guide walls are arranged to guide a fluid flow that is ejected from the V-shaped volume.

Guide walls are arranged at inner surfaces of the half-shells of the housing. The guide walls extend between the openings of the housing and the V-shaped volume between the first and second actuators to direct the fluid flow ejected from the V-shaped volume when the vibration elements move towards each other.

According to another embodiment, the guide walls are arranged in a jet-like manner tapering in a direction from the first opening of the V-shaped volume to the openings of the housing.

The guide walls are arranged to function like a jet and reduce the cross section of the area through which the air flows after it is ejected from the V-shaped volume. In other words, the cross section between the guide walls is largest close to the first opening of the V-shaped volume. The cross section gets smaller when it approaches the openings of the housing, i.e., the outlet openings of the ejected fluid flow.

When air is soaked into the V-shaped volume, air or any other fluid enters the V-shaped volume through any openings of the housing. However, due to the geometry of the volume, when the vibration elements move towards each other, a majority of the air is ejected through the larger opening of the V-shaped volume. This ejected air flow is directed through the larger opening of the V-shaped volume and through the jet-like arranged guide walls. Thus, a tapering air channel is defined by the half-shells as such and the guide walls that are arranged in the opening of the housing, and the velocity of the ejected air is increased.

When the vibration elements are moved towards each other, they may contact each other at the smaller opening of the V-shaped volume so that air is prevented from being ejected of the V-shaped volume at this side of the V-shaped volume. The larger opening of the V-shaped volume may be about 4 mm in an initial position, i.e., with the vibration elements being in a neutral position (not extracted, not retracted).

According to another embodiment, the first actuator and the second actuator are configured to be driven with an alternating voltage up to 1 kHz, particularly up to 500 Hz.

The actuators include vibration elements that create the fluid flow. Generating the fluid flow requires the fluid pump and its working principles to be adjusted properly. The efficiency of the fluid pump and the quality of the generated fluid flow depend on the size, dimension, and geometry of the housing, the actuators, the openings, etc. However, every fluid pump may have an optimum frequency to work, i.e., the frequency of the alternating voltage at which the highest velocity of the fluid flow is generated. Interestingly, this optimum working point may be that point at which the actuators have a minimum requirement for electric current. The reason may be that the actuators work with the resonance frequency of the system and don't need to counter-act the fluid flow, as would be the case when the actuators don't work at the resonance frequency. For example, the power supplied to the actuators increases when the working frequency of the actuators is increased. At a certain point, the power requirement decreases and increases again when the working frequency is further increased. This approach helps to identify the optimum working frequency of a fluid pump, namely where the power requirement has a local minimum. Exemplary working frequency may be several 10 Hertz up to several 100 Hertz or even a few kHz. The controller and the power source are configured to supply electric power at different voltage frequencies. Generally, with regard to the frequency of the alternating frequency, the frequency may be adjusted in consideration of the geometric dimensions of the fluid pump and its components. The larger the fluid pump and its components, including the V-shaped volume, the lower the operating frequency for driving the first and second actuator.

According to another aspect, a force generator arrangement is provided that comprises a first fluid pump and a second fluid pump, wherein each of the first fluid pump and the second fluid pump is a fluid pump as described herein.

According to an embodiment, the first fluid pump and the second fluid pump are arranged so that the ejection direction of the fluid flow is substantially parallel.

According to another embodiment, the first fluid pump and the second fluid pump are provided with control signals that have a phase shift with respect to one other.

According to another embodiment, the first fluid pump and the second fluid pump are inclined towards each other so that a first ejection direction of the first fluid pump and a second ejection direction of the second fluid pump intersect each other at a certain distance from the housing of the fluid pumps.

According to another embodiment, the first fluid pump and the second fluid pump are connected to a fluid channel so that the first fluid pump and the second fluid pump eject air into the fluid channel.

The force generator arrangement may include one or more of the fluid pumps described herein. The fluid pumps may be mechanically connected to each other. The ejection direction of the fluid pumps may be substantially identical or may point in different directions.

The force generator may be used as a drive for generating a recoil force based on the ejected fluid or air. When the ejection direction of two or more fluid pumps point in different directions, a force vector may be generated according to external requirements of an operator, for example.

When the ejection direction of the fluid flow of the two or more fluid pumps is substantially parallel, the force generated by the force generator arrangement is directed in the same direction and increased compared to a scenario with a single fluid pump.

Multiple fluid pumps of the force generator arrangement may be driven by phase-shifted electrical voltage signals. Thus, the fluid pumps do not eject fluid at the same time, but at different points in time. The force generated by the force generator arrangement is more continuous in that way, because the first fluid pump generates a recoil force when the second fluid pump soaks in air, and vice versa.

In an alternate embodiment, two or more fluid pumps may be connected with their fluid ejection openings to a fluid channel. The fluid pumps in this embodiment may also be driven with signals having a phase shift with respect to one another. A combined air flow is generated in the fluid channel by superposing the air flows generated by the individual fluid pumps.

The fluid pump and/or the force generator arrangement as described herein may be used as a jet propulsion drive to generate a driving force. The jet propulsion drive works on the recoil principle. The driving force is caused by the air ejected from the V-shaped volume into a direction that is defined by the opening of the V-shaped volume, the housing, and the guiding walls.

For example, the fluid pump and/or the force generator arrangement may be used in an interior room of a spacecraft or satellite in outer space, e.g., in a space station, to generate a force that is used to move an object through the interior room. Typically, in a manned spacecraft or space station, there is an air atmosphere that can be used by the fluid pump to create a recoil force as described above. When an astronaut wants to move through the spacecraft or space station, the fluid pump may be held in the hand of the astronaut or be otherwise attached to the astronaut. Depending on the direction of the ejected air flow, the fluid pump generates a force vector into a specific direction and can move the astronaut or any other object through space. With zero gravity and no other objects within the range of an astronaut, this astronaut can hardly move. However, with the fluid pump and the use described herein, a force can be generated to move the astronaut in a desired direction. Furthermore, the fluid pump can be used to generate a force to move objects like robots under zero gravity.

The fluid pump may also be used to generate a recoil force when used in boats or land vehicles.

According to another aspect, a fluid pump for generating a fluid stream is provided. The fluid pump comprises a first actuator with a first vibration element, a power source that is connected to the first actuator to supply energy to the first actuator, and a controller that is connected to the power source and configured to control the power source to vary the energy supplied to the first actuator. The first actuator is arranged opposite to a side wall of a fluid chamber so that a first movement direction of the first vibration element is inclined with respect to the opposite side wall. The controller is configured to control the power source so that the first vibration element moves towards the opposite side wall and thereby cyclically soaks in a fluid from the surroundings into the fluid chamber and ejects the fluid in a directed manner out of the fluid chamber.

In this alternate embodiment of the fluid pump, a single actuator is used. The single actuator may be designed like one of the actuators with a vibration element described above. Generally, the structural and functional features provided above with regard to the first and second actuators apply to the first actuator in this alternate embodiment. The single actuator in this embodiment is operated in a similar manner as the two actuators in the fluid pump described above, with the difference that there is no opposing actuator but an opposing wall. The vibration element is arranged opposite to a side wall of a fluid chamber so that the vibration element is inclined with respect to the opposite side wall, e.g., at an angle between 70° and 88° or 75° to 85°. Thus, when the vibration element moves towards the opposite side wall, the air is ejected from the fluid chamber due to the fact that the vibration element is inclined with respect to the opposite side wall. Air is soaked in into the fluid chamber when the vibration element moves away from the opposite side wall and air is ejected in accordance with the effect and structure of the housing as described above with regard to a two-actuator-design. When the air is ejected from the fluid chamber, air is directed by the inclined vibration element and guiding walls of the housing to create a directed air stream in accordance with the principles described above. In this embodiment, the V-shaped volume is located between the first actuator and the opposite side wall. The first actuator and/or the opposite side wall may be inclined with respect to one another.

BRIEF DESCRIPTION OF THE DRAWINGS

The fluid pump and the force generator arrangement will hereinafter be described in conjunction with the following drawing figures, wherein like numerals denote like elements, and wherein.

DETAILED DESCRIPTION OF THE DRAWINGS

Figure 1:
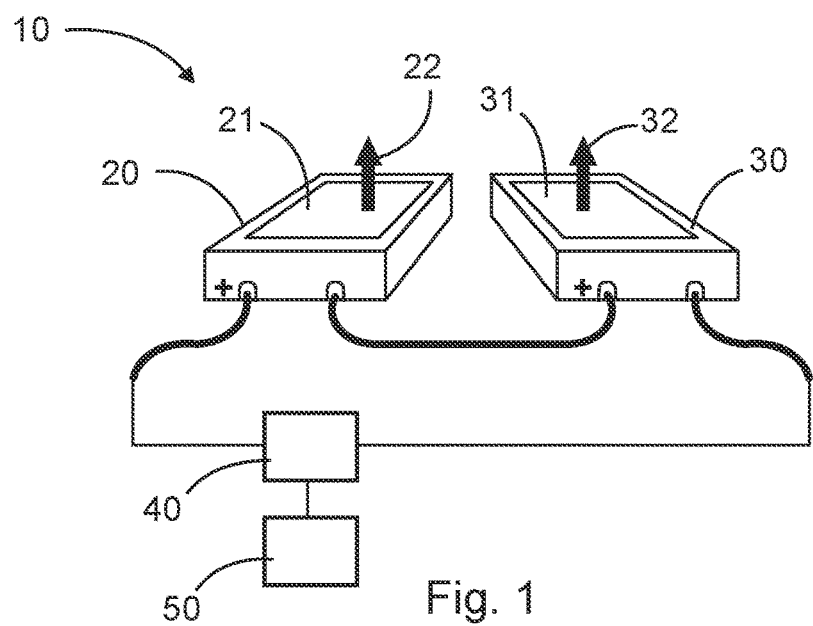
FIG. 1 shows a schematic view of a part of a fluid pump.

The following detailed description is merely exemplary in nature and is not intended to limit the invention and uses of the invention. Furthermore, there is no intention to be bound by any theory presented in the preceding background or the following detailed description.

The representations and illustrations in the drawings are schematic and not to scale. Like numerals denote like elements.

A greater understanding of the described subject matter may be obtained through a review of the illustrations together with a review of the detailed description that follows.

FIG. 1 shows some parts of a fluid pump 10. The fluid pump 10 comprises a first actuator 20 and a second actuator 30 which are powered with electrical energy by a power source 40. The power source 40 is controlled by a controller 50.

Each actuator 20, 30 comprises a vibration element 21, 31. The vibration elements 21, 31 are configured to repeatedly move along a movement direction 22, 32, respectively. The vibration elements 21, 31 repeatedly carry out up and down movements. For example, the actuators 20, 30 are loudspeakers and the vibration elements 21, 31 are membranes or the respective loudspeaker.

The actuators are wired so that their movement is synchronized. That means that the vibration elements extend or push outwards at the same time and contract or pull inwards subsequently (after the outward movement) and at the same time.

Figure 2:
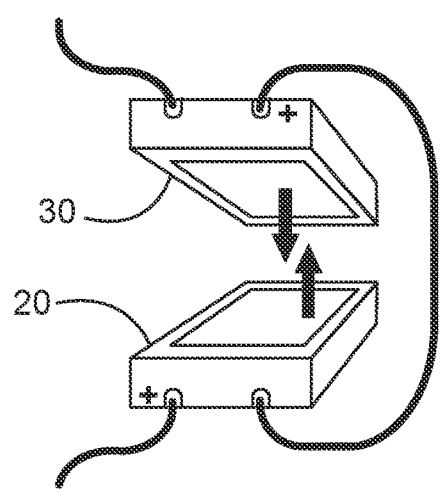
FIG. 2 shows a schematic view of a fluid pump with first and second actuators.

FIG. 2 shows the fluid pump 10 with similar elements as already described with reference to FIG. 1. The first actuator 20 and the second actuator 30 are arranged opposite to each other so that each vibration element moves towards and away from the other actuator. The actuators 20, 30 are powered so that the respective vibration elements move towards each other at the same time and subsequently away from each other also at the same time, i.e., the movement of the vibration elements is synchronized. As a result of this movement, the space between the actuators and the vibration elements alternatingly becomes smaller (when the vibration elements of the opposite actuators move towards each other) and bigger (when the vibration elements of the opposite actuators move away from each other). This alternating movement of the vibration elements of the actuators generates a pumping effect that acts on a fluid (like air, other gases, or liquids) that is located between the vibration elements.

Figure 3:
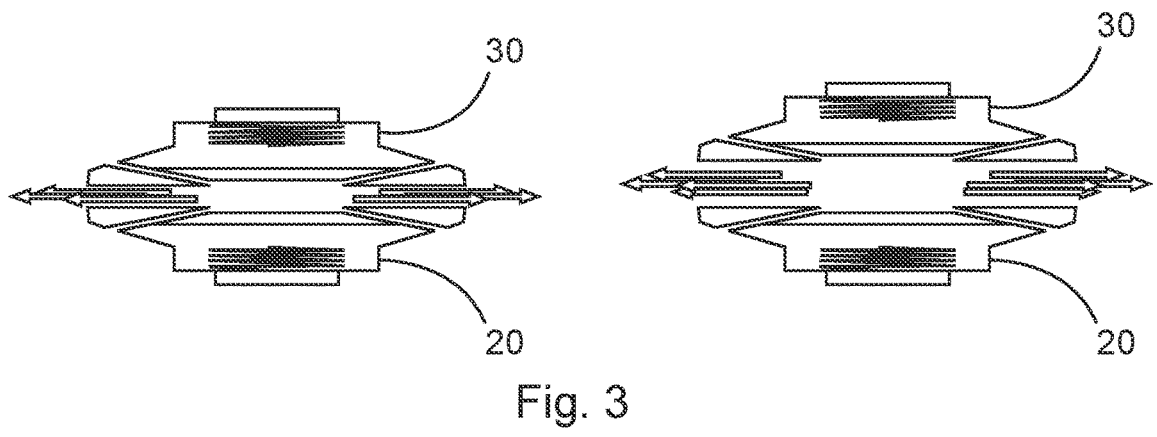
FIG. 3 schematically shows first and second actuators of a fluid pump.

FIG. 3 shows two different configurations of a fluid pump with a different distance between the first actuator 20 (left side) and the second actuator 30 (right side).

When the airgap (i.e., distance between opposite actuators 20, 30) is small (e.g., 2 mm) in relation to the width and length of the speaker membrane (e.g., 23.5 mm 33.5 mm), then the air may have a challenge to escape in the desired direction. As a consequence, the major part of the air will escape from that one of the speaker sides (from the speaker center to the speaker side) that promises the lowest resistance to the outwardly moving air. Inhaling air will happen from all sides of the speaker.

Figure 4:
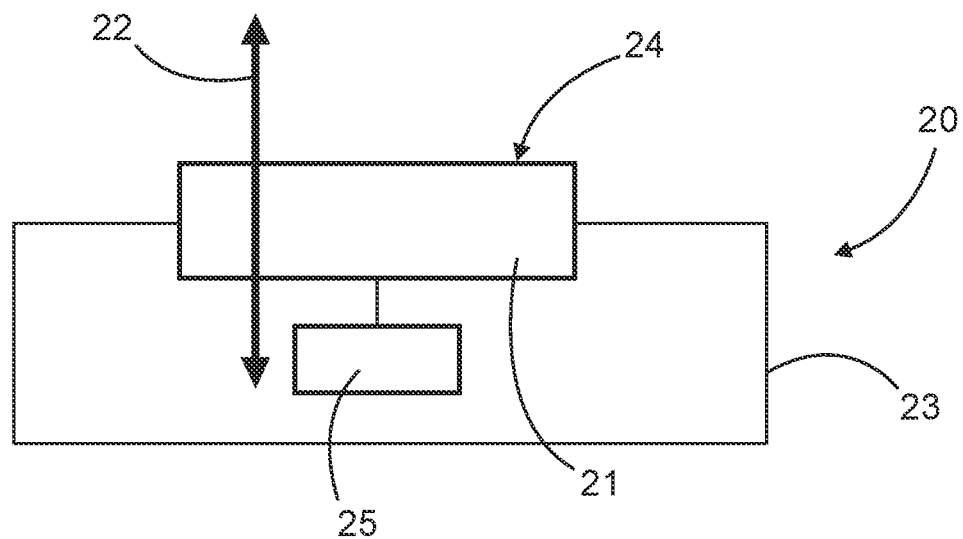
FIG. 4 shows a schematic representation of an actuator of a fluid pump.

FIG. 4 schematically shows a first actuator 20. The first actuator 20 comprises a vibration element 21 that is configured to move up and down along the movement direction 22. A force generator 25 is coupled with the vibration element 21 to cause the movement along direction 22. The vibration element 21 and the force generator 25 are located in a housing 23.

The force generator 25 may be an electric coil, a piezoelectric element, a hydraulic element, an electric motor, or the like. Generally, the force generator is typically driven with electric energy and generates a mechanical force based on said electric energy.

When the vibration element 21 moves along the direction 22 upwards, a working surface 24 of the vibration element acts on the fluid located at or on the vibration element and thereby causes the pumping effect.

Figure 5:
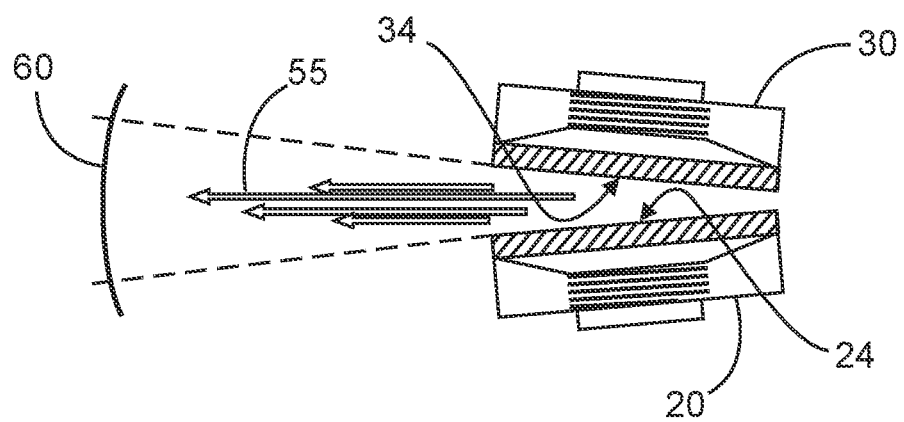
FIG. 5 shows a schematic representation of first and second actuators of a fluid pump.

FIG. 5 shows a side view of a fluid pump with a first actuator 20 and a second actuator 30 arranged opposite to each other and inclined with respect to each other so that an opening angle is defined for the space between the working surfaces 24, 34 of the respective vibration elements. The space between the working surfaces 24, 34 is V-shaped. When the working surfaces of the vibration elements move towards each other, the fluid between the working surfaces 24, 34 is pushed outward from the volume between the vibration elements. As the vibration elements are inclined with respect to each other, the major part of the fluid is pushed in the direction at which the opening angle 60 opens. This direction also defines the ejection direction of fluid flow 55.

The fluid pump with one or two actuators described herein creates a fluid flow because the vibration elements (e.g., membrane, working surface) are angled with respect to each other (i.e., not parallel) or with respect to the opposite side wall of the fluid chamber.

The amount of fluid per time pumped by the fluid pump (the amount of fluid per time corresponds to the generated force) can be determined by varying the amplitude and/or frequency of a power signal commanded by the controller 50 and supplied by the power source to the first and second actuators.

Figure 6:
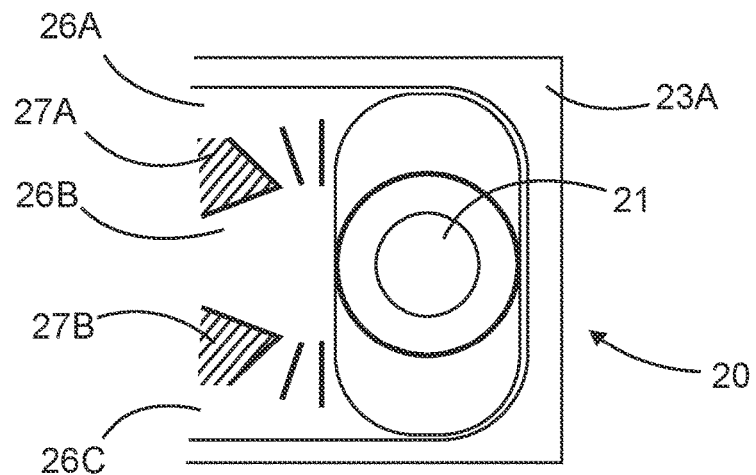
FIG. 6 shows a schematic representation of an actuator of a fluid pump.

FIG. 6 shows a top view onto the first actuator 20 (lower actuator in FIG. 5). The first actuator 20 is located in a first half-shell 23A of the housing and the vibration element 21 moves substantially up and down out of the drawing layer. The first half-shell 23A defines openings 26A, 26B, 26C and guide walls 27A 27B located between the openings 26A, 26B, 26C. When the vibration element 21 moves upwards, it pushes fluid through the openings 26A, 26B, 26C. The guide walls 27A, 27B are arranged to guide the fluid flow when the fluid is ejected from the volume between the vibration elements.

Figure 7:
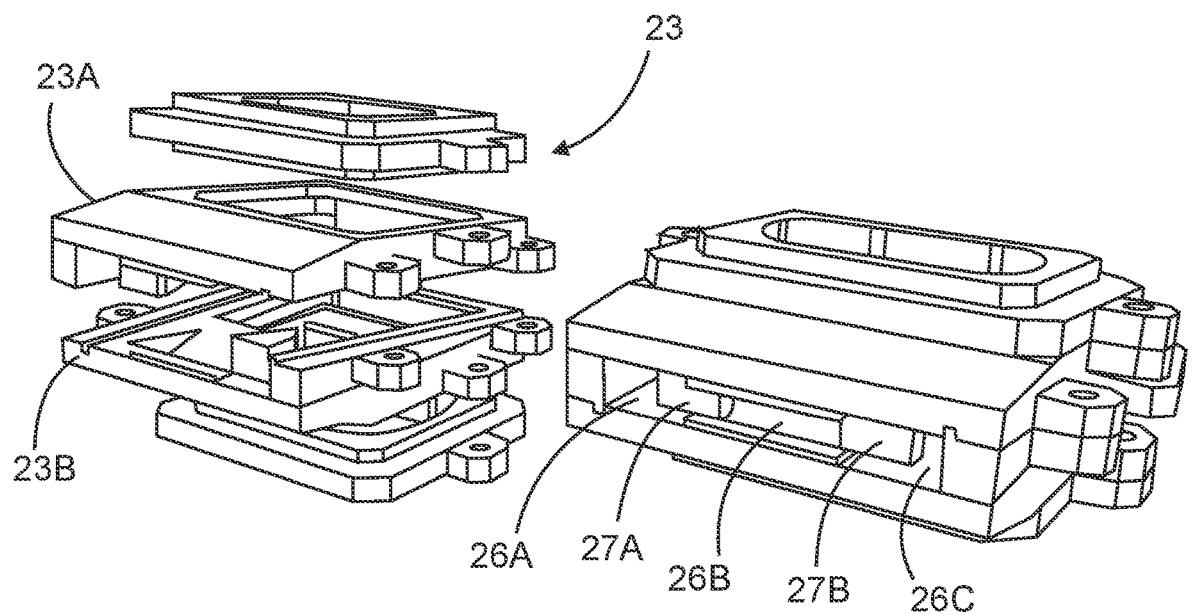
FIG. 7 shows a schematic representation of a housing of a fluid pump.

FIG. 7 shows the housing 23 of a fluid pump. The housing comprises two half-shells 23A, 23B which are embraced by outer shells. The first and second half-shells 23A, 23B define the openings 26A, 26B, 26C and the guide walls 27A, 27B. Other mounting places are provided in the half-shells to mount the actuators therein. For example, a first actuator 20 is mounted in the first half-shell 23A, and a second actuator 30 is mounted in the second half-shell 23B.

On the right hand side in FIG. 7, the housing is shown in an assembled state. The first and second half-shells are embraced by outer shells and held in position. In this assembled state and with first and second actuators mounted to the housing, the fluid pump implements the principle described with reference to the preceding drawings. In particular, in the assembled state shown at the right hand side in FIG. 7, the first and second actuators are arranged as shown and described with reference to FIG. 5.

Figure 8:
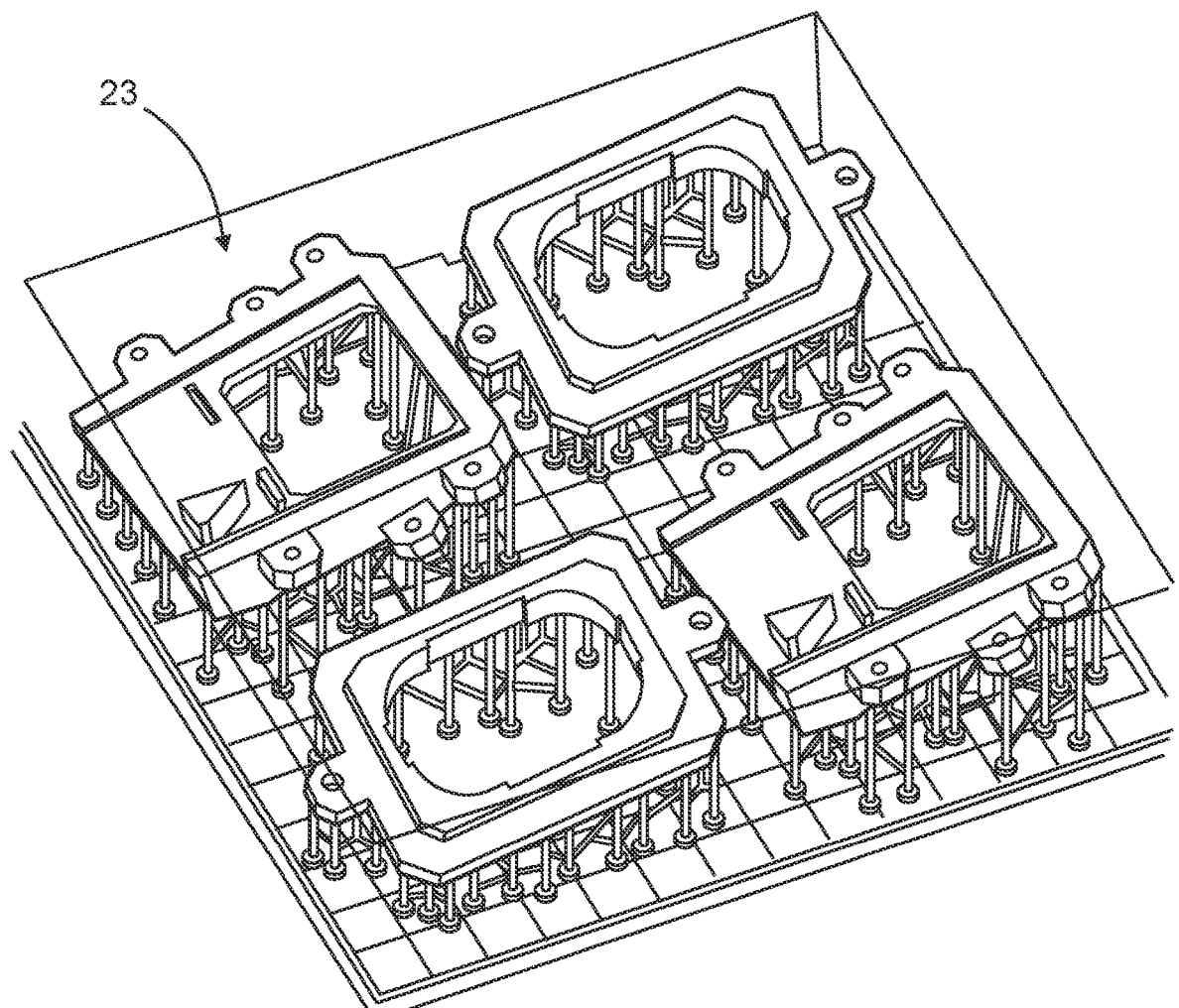
FIG. 8 schematically shows the parts of a housing of a fluid pump.

The half-shells of the housing may be produced by using 3D-printing techniques. The half-shells and the outer shells are exemplarily shown in FIG. 8. One guide wall may be printed to the first half-shell while the other guide wall is printed to the second half-shell. Of course, it is possible that both guide walls are printed to the same half-shell. Furthermore, the number of guide walls is not limited to the examples shown here. One, two or more guide walls may be used. However, when the half-shells are assembled, the guide walls adjoin the opposite half-shell so that the fluid pressed out of the volume between the actuators is guided by the guide walls along the openings defined by the guide walls and the half-shells.

Figure 9:
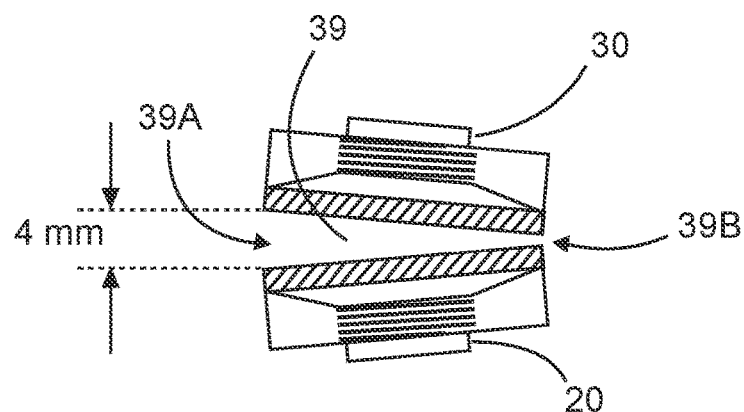
FIG. 9 shows a schematic representation of first and second actuators of a fluid pump.

FIG. 9 shows a fluid pump with a first actuator 20 and a second actuator 30. A volume 39 is defined between the working surfaces of the vibration elements of the respective actuators. The volume 39 is V-shaped, resulting from the fact that an opening angle 60 is defined between the working surfaces of the actuators, as described with reference to FIG. 5. A first opening 39A is defined on the left hand side of the volume 39, and a second opening 39B is defined on the right hand side of the volume 39. The first opening 39A is bigger than the second opening 39B. In one embodiment, the first opening is about 4 mm while the second opening 39B is 1 mm or even less.

Figure 10:
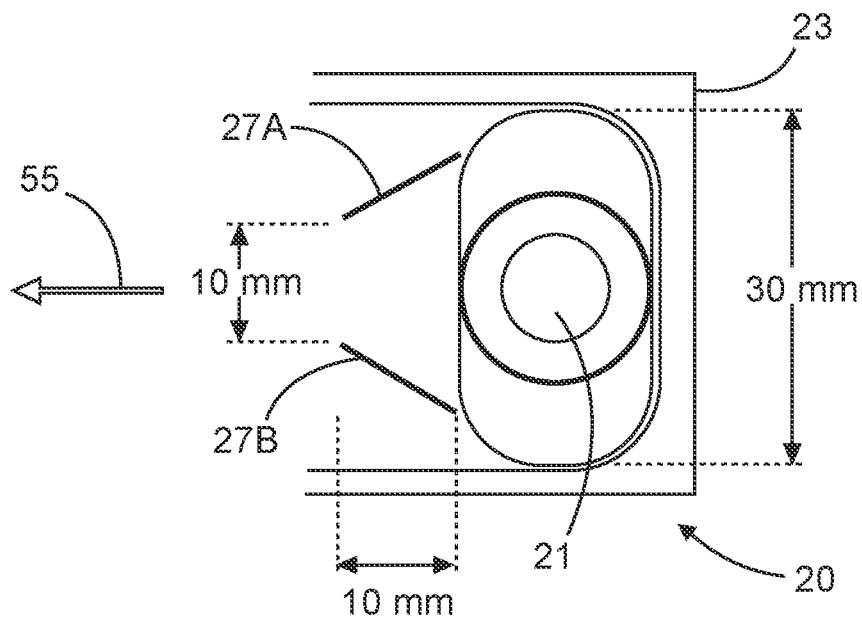
FIG. 10 shows a schematic representation of an actuator of a fluid pump.

FIG. 10 shows a top view of the first actuator 20 located in the housing 23. The vibration element may have a width of 30 mm. Guide walls 27A, 27B are located close to the vibration element and guide the fluid pushed aside by the vibration element through the first opening 39A (see FIG. 9) and define the ejection direction of the fluid flow 55. The outer opening of the guide walls 27A, 27B may have a width of 10 mm, i.e., one third of the width of the vibration element 21.

While certain dimensions are referred to in this example, it should be understood that those are not intended to limit the scope of the disclosure.

In certain embodiments, the vibration elements 21, 31 are non-symmetrical in shape, i.e., width and length are different, as can be seen in FIG. 10. The working surface may be rectangular or oval. In other embodiments, the working surface is symmetrical in shape. In this case, it may be beneficial that the working surface moves non-parallel and non-perpendicular to the side wall or to the opposite actuator.

In one embodiment, the fluid pump comprises an actuator with a working surface that is non-symmetrical in shape (i.e., it is oval or rectangular shaped), two membranes (two actuators) are placed opposite to each other, and the two actuators are angled in relation to each other. The angle between the two membranes (that are placed opposite to each other) depends on the membrane size (active surface area) and the achievable stroke (the larger the stroke, the larger the optimal angle will be.

When the membrane is longer than wide (non-symmetrical, see FIG. 10), then the gas will take the shortest distance possible to escape the squeezing-effect. Meaning that when the membrane is pushing outwards (in relation to the actuator itself, i.e., towards the opposite actuator) then the gas molecules placed in front of the membrane will move mainly to the left and the right side. However, when the membrane moves inwardly, gas is soaked in inwards (in relation to the actuator) from all sides (360° around the membrane).

When the wall opposite to the membrane is angled (or when the second membrane is angled) in relation to the first membrane, then the gas molecules will mainly move towards the side with the wider gap or with the shorter way (left/right in FIGS. 5, 6, 9, 10).

The actuators may be powered by a sinewave like signal (voltage or current), by a square signal (on-off), or something between (pseudo sine wave like shape). While the square (digital) like system provides more efficient results (more gas pumping for less energy), it is harsh on the membrane (creates more stress to the membrane). A sinus like signal may be less effective but also applies less mechanical stress to the membrane (longer product lifetime). This signal is commanded by the controller 50 and generated and provided by the power source 40 to the first and second actuators.

The signal frequency needed to drive such an actuator depends on the physical size of the membrane and its stroke and on the air pressure. The larger the air-pressure and the larger the surface area of a single membrane, the lower the operating frequency may be. Assuming that a single membrane has the size of a coffee cup sources (8 to 12 cm in diameter), the operating frequency is well below 100 Hz (near 10 Hz). When the actuator surface is about 4 cm$^2$, for example, the operating frequency shifts towards 500 Hz or even near 1 kHz.

While certain embodiments have been described with two actuators being arranged opposite to each other, it is noted that the principle of the fluid pump will also work with only one actuator when a wall (for example of a housing) is arranged opposite to the single actuator, and the single actuator and the wall are inclined towards each other so that the moving direction of the vibration element is non perpendicular with respect to the wall. In that case, the volume between the wall and the working surface of the single actuators is also V-shaped so that the same principle applies as described with reference to FIG. 5 and FIG. 9, for example.

Figure 11:
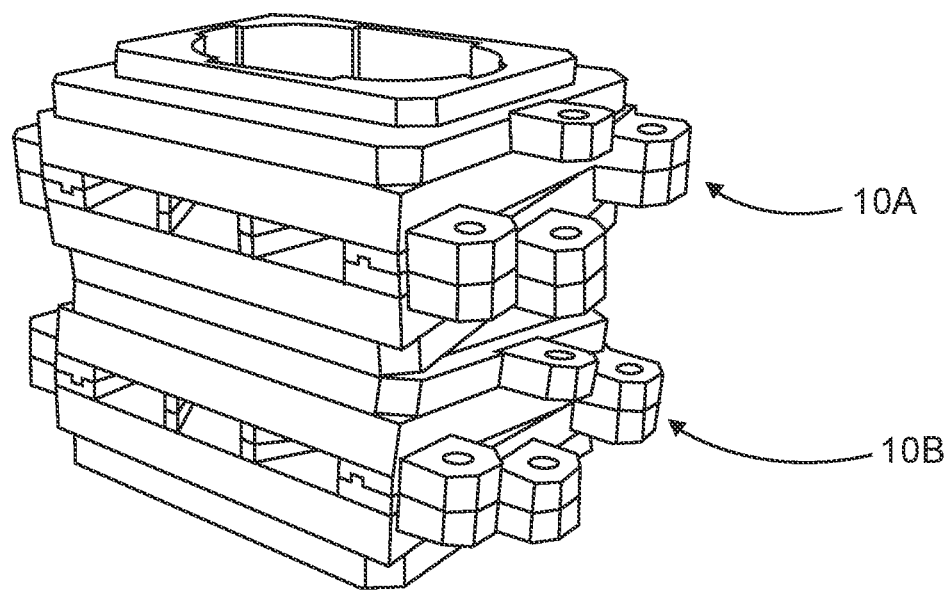
FIG. 11 shows a force generator arrangement with two fluid pumps.

FIG. 11 shows a force generator arrangement with two fluid pumps 10A, 10B. While the fluid pumps 10A, 10B are only schematically shown here, it is understood that the fluid pumps include the elements that are required to implement the pumping effect as described herein.

Each fluid pump 10A, 10B works in accordance with the principles described herein and generates a repelling force by pumping a fluid out of the openings of the fluid pump housings. By using multiple fluid pumps, the amount of the generated force is increased.

The fluid pumps may be oriented in different directions. In that case, the individual fluid pumps may be controlled individually to generate a repelling force and the resulting direction in which the force generator arrangement is moved can be determined. For example, four fluid pumps may be coupled to each other in a manner that each fluid pump has an ejection direction of the fluid flow in four different directions 90° different from each other (left, right, back, forth). Depending on which fluid pump is powered at what intensity, the direction of the resulting force can be determined freely as desired.

Figure 12:
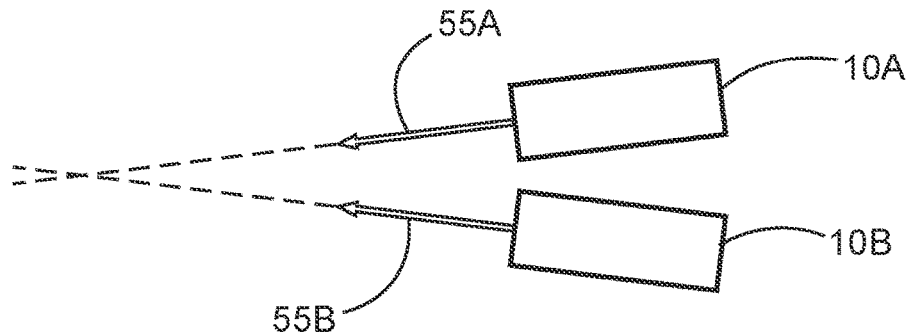
FIG. 12 schematically shows a force generator arrangement with two fluid pumps.

FIG. 12 shows two fluid pumps 10A, 10B with ejection directions 55A, 55B pointing towards each other. The fluid flows ejected by the two fluid pumps 10A, 10B superpose after being ejected by the fluid pumps and, therefore, generate a higher propulsion force.

Figure 13:
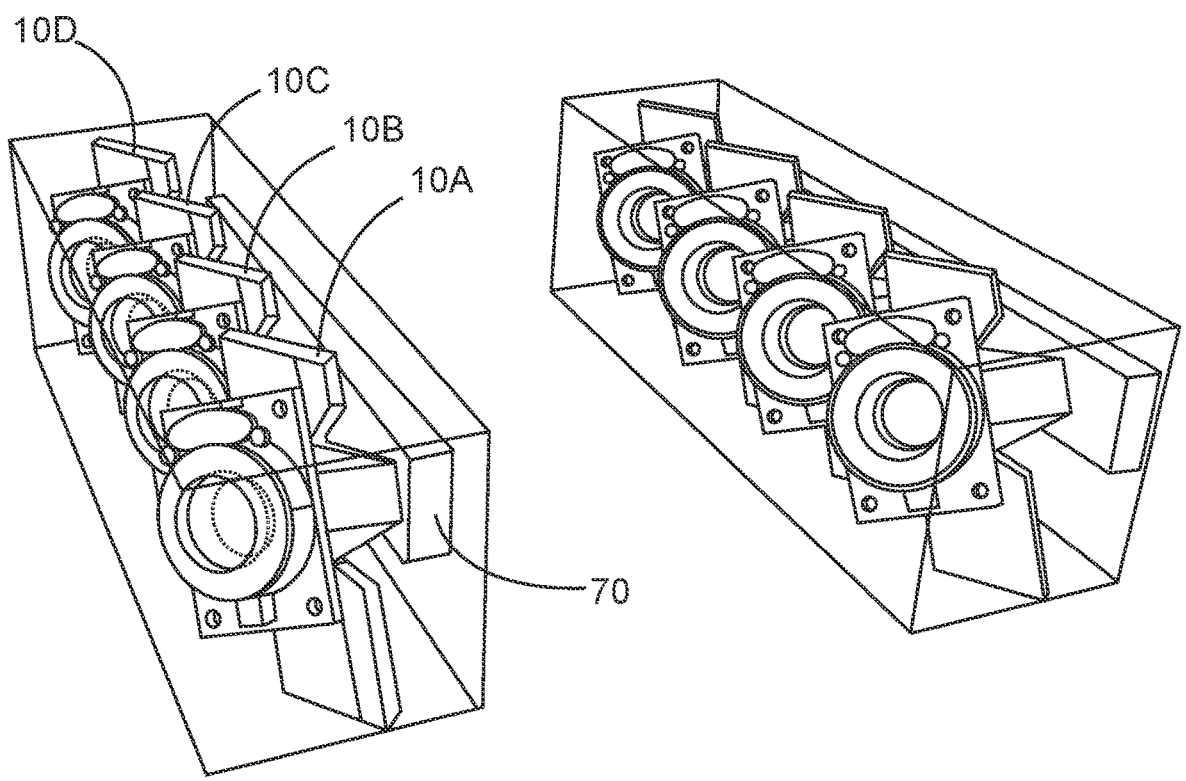
FIG. 13 schematically shows a force generator arrangement with multiple fluid pumps arranged in two groups opposite to each other.

FIG. 13 shows a force generator module with two identical fluid pump arrays, each of which includes four fluid pumps 10A, 10B, 10C, 10D. The fluid pumps of one array are coupled so that the ejected fluid flow of each fluid pump enters a fluid channel 70 which guides the sum of all fluid flows generated by the fluid pumps of one fluid pump array.

In this embodiment, the fluid pumps may be powered consecutive in a predetermined order so that one or more fluid pumps eject fluid while one or more other fluid pumps soak in fluid for the next cycle. Thus, a continuous fluid flow is ejected from the fluid channel 70. The fluid pumps of the two fluid pump arrays may be controlled so that any noise generated by the loudspeakers is cancelled by the loudspeakers of the other fluid pump. This can be done by powering the first fluid pump array with a first control signal and the second fluid pump array by a second control signal which corresponds to the inverted first control signal.

While certain examples are described with reference to loudspeakers, it is understood that other actuators may be used, e.g., piezoelectric elements, to implement the same principle as described with reference to loudspeakers.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It will be understood that various changes may be made in the function and arrangement of elements described in an exemplary embodiment without departing from the scope of the claims.

Additionally, it is noted that "comprising" or "including" does not exclude any other elements or steps and "a" or "an" does not exclude a multitude or plurality. It is further noted that features or steps which are described with reference to one of the above exemplary embodiments may also be used in combination with other features or steps of other exemplary embodiments described above. Reference signs in the claims are not to be construed as a limitation.

LIST OF REFERENCE SIGNS 10 fluid pump, preferably for pumping gaseous fluids
20 first actuator (loudspeaker, piezoelectric element)
21 vibration element
22 movement direction
23 housing
23A first half-shell
23B second half-shell
24 working surface
25 force generator (electric coil, piezoelectric element, hydraulic element, motor)
26A-26C opening
27A, 27B guide wall
30 second actuator 31 vibration element
32 movement direction
39 volume between the vibration elements
39A first opening
39B second opening
40 power source
50 controller
55 ejection direction of fluid flow
60 opening angle
70 fluid channel

The invention claimed is:

1. A force generator arrangement, comprising:
a first fluid pump; and
a second fluid pump,
wherein each of the first and second fluid pumps includes:
   a first actuator including a first vibration element;
   a second actuator including a second vibration element;
   a power source connected to the first and second actuators to supply energy to the first and second actuators; and
   a controller connected to the power source and configured to control the power source to vary the energy supplied to the first and second actuators,
wherein the first and second actuators are arranged opposite to each other so that a first movement direction of the first vibration element is inclined with respect to a second movement direction of the second vibration element,
wherein the controller is configured to control the power source so that the first vibration element moves towards the second actuator and the second vibration element moves towards the first actuator in a synchronous manner and thereby cyclically soaks in a fluid from the surroundings and ejects the fluid in a directed manner, and
wherein the first and second fluid pumps are inclined towards each other so that a first ejection direction of the first fluid pump and a second ejection direction of the second fluid pump intersect each other at a certain distance from the housings of the fluid pumps.

2. The force generator arrangement of claim 1, wherein the first and second actuators are arranged so that a volume between the first and second vibration elements is V-shaped and wherein a first opening of the volume is larger than a second opening that is arranged opposite to the first opening.

3. The force generator arrangement of claim 1, wherein the first and second actuators are selected from the group consisting of: a loudspeaker, a piezoelectric element, a hydraulic element connected to a first piston, and a motor connected to a second piston.

4. The force generator arrangement of claim 1,
wherein each of the fluid pumps includes: a respective housing including at least two half-shells, wherein the first actuator is attached to a first half-shell of the at least two half-shells and the second actuator is attached to a second half-shell of the at least two half-shells.

5. The force generator arrangement of claim 4, wherein the housing defines one or more openings in a side wall that is arranged close to a first opening of a V-shaped volume.

6. The force generator arrangement of claim 5, wherein the housing includes guide walls arranged between the one or more openings of the housing and the first opening of the V-shaped volume and wherein the guide walls are arranged to guide a fluid flow that is ejected from the V-shaped volume.

7. The force generator arrangement of claim 6, wherein the guide walls are arranged in a jet-like manner tapering in a direction from the first opening of the V-shaped volume to the one of more openings of the housing.

8. The force generator arrangement of claim 1, wherein the first and second actuators are configured to be driven with an alternating voltage up to 1 kHz.

9. The force generator arrangement of claim 1, wherein the first and second actuators are configured to be driven with an alternating voltage up to 500 Hz.

10. The force generator arrangement of claim 1, wherein the first and second fluid pumps are provided with control signals that have a phase shift with respect to one another.

* * * * *